US009224055B2

(12) United States Patent
Kido

(10) Patent No.: US 9,224,055 B2
(45) Date of Patent: Dec. 29, 2015

(54) EXTERIOR ENVIRONMENT RECOGNITION DEVICE

(71) Applicant: FUJI JUKOGYO KABUSHIKI KAISHA, Tokyo (JP)

(72) Inventor: Shinnosuke Kido, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 14/070,438

(22) Filed: Nov. 1, 2013

(65) Prior Publication Data

US 2014/0132769 A1 May 15, 2014

(30) Foreign Application Priority Data

Nov. 9, 2012 (JP) .................... 2012-247371

(51) Int. Cl.
H04N 7/18 (2006.01)
G06K 9/00 (2006.01)
G06K 9/32 (2006.01)

(52) U.S. Cl.
CPC ........ *G06K 9/00825* (2013.01); *G06K 9/00791* (2013.01); *G06K 9/00805* (2013.01); *G06K 9/3233* (2013.01); *H04N 7/18* (2013.01)

(58) Field of Classification Search
None
See application file for complete search history.

(56) References Cited

U.S. PATENT DOCUMENTS

| 5,521,633 A * | 5/1996 | Nakajima et al. ............. 348/118 |
| 7,619,649 B2 * | 11/2009 | Kogure et al. ................ 348/148 |
| 2003/0138133 A1 * | 7/2003 | Nagaoka et al. .............. 382/104 |
| 2007/0115357 A1 * | 5/2007 | Stein et al. .................... 348/148 |
| 2010/0074469 A1 * | 3/2010 | Nakamori et al. ............ 382/103 |
| 2010/0094501 A1 * | 4/2010 | Kwok ............................. 701/36 |
| 2010/0103262 A1 * | 4/2010 | Fardi ............................ 348/148 |
| 2010/0253489 A1 * | 10/2010 | Cui et al. ................... 340/425.5 |
| 2012/0147187 A1 * | 6/2012 | Li et al. ........................ 348/148 |
| 2012/0288145 A1 * | 11/2012 | Kido ............................. 382/103 |

FOREIGN PATENT DOCUMENTS

| JP | 09-185797 A | 7/1997 |
| JP | 2001-103496 A | 4/2001 |
| JP | 2003-044863 A | 2/2003 |
| JP | 2006-301803 A | 11/2006 |
| JP | 2010-224925 A | 10/2010 |
| JP | 2011-123613 A | 6/2011 |

* cited by examiner

*Primary Examiner* — Joseph Ustaris
*Assistant Examiner* — Rebecca Volentine
(74) *Attorney, Agent, or Firm* — McDermott Will & Emery LLP

(57) ABSTRACT

An exterior environment recognition device includes: a specific object detection unit to detect a specific object on the basis of a color image; a data retaining unit to associate and retain the specific object and a luminance range indicating the color of the specific object; and a transparency reduction determination unit to compare a luminance of the color image of the specific object and a luminance range associated with the specific object, and to determine a reduction in transparency of a transparent body located in an image-capturing direction of the onboard camera.

14 Claims, 14 Drawing Sheets

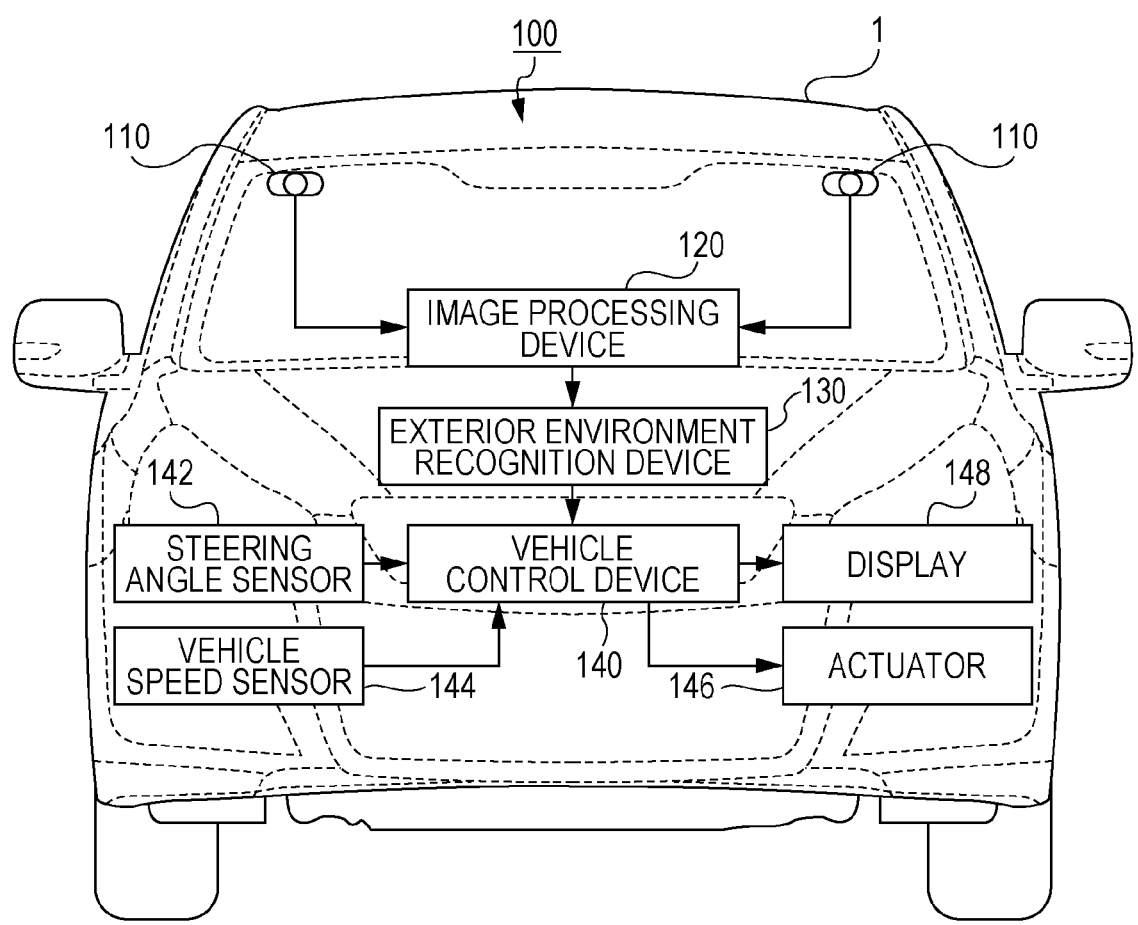

FIG. 5A

| IDENTIFICATION NUMBER | | 1 | 2 | 3 | 4 |
|---|---|---|---|---|---|
| SPECIFIC OBJECT | | TRAFFIC LIGHT (RED) | TRAFFIC LIGHT (BLUE) | ROAD SIGN (BLUE) | ROAD SIGN (GREEN) |
| LUMINANCE RANGE | R | REFERENCE VALUE | ≤B×0.35 | ≤B×0.7 | ≤G×0.8 |
| | G | ≤R×0.5 | ≤B×1.05 | ≤B×0.8 | REFERENCE VALUE |
| | B | ≤R×0.38 | REFERENCE VALUE | REFERENCE VALUE | ≤G×0.9 |
| HEIGHT RANGE (m) | | 4.5 TO 7.0 | 4.5 TO 7.0 | 1.5 TO 10.0 | 1.5 TO 10.0 |
| WIDTH RANGE (m) | | 0.05 TO 0.2 | 0.05 TO 0.2 | 0.3 TO 1.0 | 0.3 TO 1.0 |

FIG. 5B

| IDENTIFICATION NUMBER | | 1 | 2 | 3 | 4 |
|---|---|---|---|---|---|
| SPECIFIC OBJECT | | TRAFFIC LIGHT (RED) | TRAFFIC LIGHT (BLUE) | ROAD SIGN (BLUE) | ROAD SIGN (GREEN) |
| LUMINANCE RANGE | R | REFERENCE VALUE | ≥B×0.25 | ≥B×0.55 | ≥G×0.65 |
| | G | ≥R×0.35 | ≥B×0.95 | ≥B×0.65 | REFERENCE VALUE |
| | B | ≥R×0.2 | REFERENCE VALUE | REFERENCE VALUE | ≥G×0.75 |

FIG. 5C

| IDENTIFICATION NUMBER | | 1 | 2 | 3 | 4 |
|---|---|---|---|---|---|
| SPECIFIC OBJECT | | TRAFFIC LIGHT (RED) | TRAFFIC LIGHT (BLUE) | ROAD SIGN (BLUE) | ROAD SIGN (GREEN) |
| LUMINANCE RANGE | R | REFERENCE VALUE | =B×0.15 | =B×0.4 | =G×0.4 |
| | G | =R×0.25 | =B×0.85 | =B×0.5 | REFERENCE VALUE |
| | B | =R×0.1 | REFERENCE VALUE | REFERENCE VALUE | =G×0.5 |

(a) G/R = 0.375 (≤ 0.5), B/R = 0.15 (≤ 0.38)
DETERMINE SPECIFIC OBJECT
"ROAD SIGN (RED)"

(b) G/R = 0.375 (≥ 0.35), B/R = 0.15 (≤ 0.2)
DETERMINE REDUCTION OF TRANSPARENCY

DECREASE

⋮

DECREASE
R = 108, G = 33, B = 6
(c) G/R = 0.306 (≠ 0.25), B/R = (0.056 ≠ 0.1)
ABSOLUTE VALUE OF AVERAGE OF DIFFERENCE
|((0.306 − 0.25) + (0.056 − 0.1))/2| = 0.006

DECREASE
R = 107, G = 32, B = 5
(d) G/R = 0.299 (≠ 0.25), B/R = (0.047 ≠ 0.1)
ABSOLUTE VALUE OF AVERAGE OF DIFFERENCE
|((0.299 − 0.25) + (0.047 − 0.1))/2| = 0.002

DECREASE
R = 106, G = 31, B = 4
(e) G/R = 0.292 (≠ 0.25), B/R = (0.038 ≠ 0.1)
ABSOLUTE VALUE OF AVERAGE OF DIFFERENCE
|((0.292 − 0.25) + (0.038 − 0.1))/2| = 0.010

DIFFERENCE 120 − 107 = 13 → AMOUNT OF CORRECTION

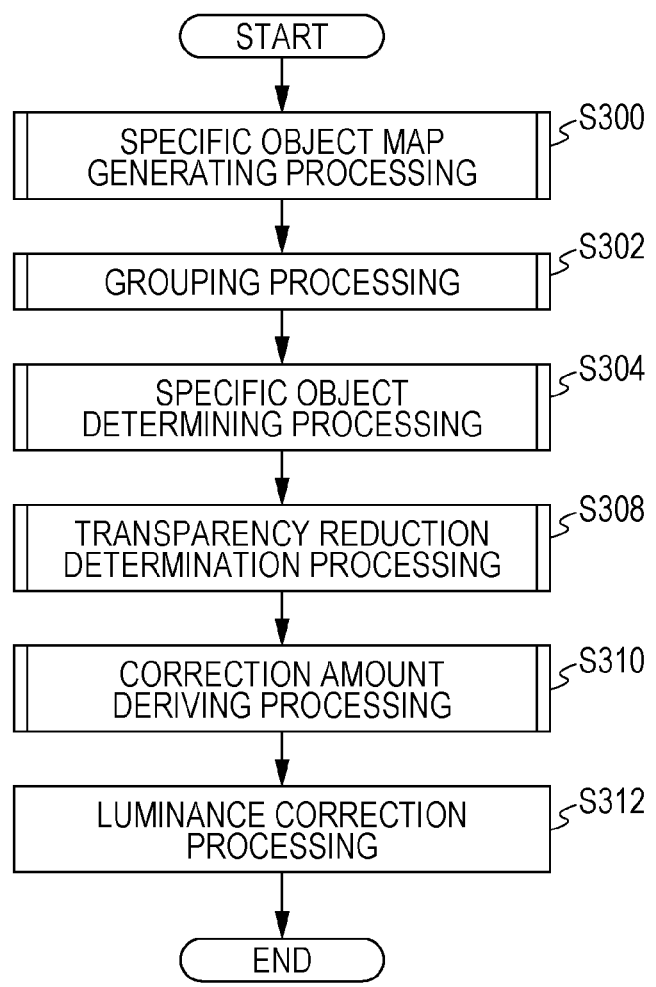

EXTERIOR ENVIRONMENT RECOGNITION DEVICE

CROSS-REFERENCE TO RELATED APPLICATIONS

The present application claims priority from Japanese Patent Application No. 2012-247371 filed on Nov. 9, 2012, the entire contents of which are hereby incorporated by reference.

BACKGROUND

1. Technical Field

The present invention relates to an exterior environment recognition device for recognizing environment outside of a subject vehicle, and, more particularly, relates to an exterior environment recognition device for detecting dirt or fog adhered to optical components and the windshield and appropriately processing an image according to a detection result.

2. Related Art

There have been known exterior environment recognition devices such as one described in Japanese Unexamined Patent Application Publication (JP-A) No. 2010-224925. The exterior environment recognition device has an onboard camera mounted on a vehicle to capture an image of road environment in front of a subject vehicle, and detects light sources such as a traffic light and a brake lamp on the basis of color information and position information in the image.

When a light source is detected using color information in an image as described above, the following problem may occur: if strong environment light such as sunlight (image capturing against the sunlight) is emitted in the image-capturing direction while there is dirt or fog on a transparent body such as a windshield located in the image-capturing direction and an optical component such as a lens, then, the color component of the environment light is added to the entire captured image, and this causes the target object in the image to have a color different from the original color. As a result, the recognition accuracy of the light source using the color information is reduced, or it becomes impossible to recognize the light source.

SUMMARY OF THE INVENTION

The present invention is made in view of such problem, and it is an object of the present invention to provide an exterior environment recognition device capable of detecting existence of dirt or fog on the windshield and an optical component of an onboard camera and appropriately recognizing an image using color information even under such environment.

An aspect of the present invention provides an exterior environment recognition device for recognizing the environment outside of a subject vehicle, on the basis of a color image captured by an onboard camera. The exterior environment recognition device includes: a specific object detection unit to detect a specific object on the basis of the color image; a data retaining unit to associate and retain the specific object and a luminance range indicating the color of the specific object; and a transparency reduction determination unit to compare a luminance of the color image of the specific object and a luminance range associated with the specific object and to determine a reduction in transparency of a transparent body located in an image-capturing direction of the onboard camera.

The data retaining unit may further retain and associate the specific object and the original luminance of the specific object, and the exterior environment recognition device may further include a correction amount deriving unit to derive the amount of correction on the basis of a difference between luminance in the color image of the specific object and the original luminance associated with the specific object, and a luminance correction unit to correct the luminance of the target portion of the color image on the basis of the amount of correction thus derived. The specific object detection unit may detect the specific object on the basis of the corrected color image.

Another aspect of the present invention provides an exterior environment recognition device for recognizing the environment outside of a subject vehicle, on the basis of a color image captured by an onboard camera. The exterior environment recognition device includes: a specific object detection unit to detect a specific object on the basis of the color image, a data retaining unit to associate and retain the specific object and an original luminance indicating the color of the specific object; a correction amount deriving unit to derive the amount of correction on the basis of a difference between a luminance in the color image of the specific object and the original luminance associated with the specific object; and a luminance correction unit to correct the luminance of the target portion of the color image on the basis of the amount of correction thus derived. The specific object detection unit detects the specific object on the basis of the corrected color image.

The exterior environment recognition device may further include a transparency reduction detection unit to detect a reduction in the transparency of the transparent body located in an image-capturing direction of the onboard camera. The correction amount deriving unit derives the amount of correction when the reduction in the transparency of the transparent body is detected.

The correction amount deriving unit may derive a basic amount of correction obtained by dividing the derived amount of correction by an exposure time of the color image, and the luminance correction unit may correct the luminance of the target portion of the color image on the basis of the amount of correction obtained by multiplying the basic amount of correction by the exposure time of the color image of correction target.

The correction amount deriving unit may derive the amount of correction per divided region obtained by dividing the color image into multiple regions.

The correction amount deriving unit may derive an amount of correction of a divided region for which the amount of correction is not derived, on the basis of an amount of correction of a divided region for which an amount of correction is derived.

The correction amount deriving unit may adopt again, as the amount of correction, a time average value of the amount of correction derived on the basis of a difference between luminance of the color image of the specific object and the original luminance associated with the specific object and the amount of correction previously derived in the same detection region or the same divided region.

The specific object detection unit may detect the specific object on the basis of a temporal luminance change of the color image over time.

BRIEF DESCRIPTION OF THE DRAWINGS

FIG. 1 is a block diagram illustrating a connection relationship in an environment recognition system;

FIG. 5A is an explanatory diagram for explaining a specific object correspondence table;

FIG. 5B is an explanatory diagram for explaining a dirt determination table;

FIG. 5C is an explanatory diagram for explaining a correction reference table;

FIG. 10 is another explanatory diagram for explaining processing of the correction amount deriving unit;

FIG. 11 is a flowchart illustrating an overall flow of an environment recognition method;

DETAILED DESCRIPTION

Figure 2A:
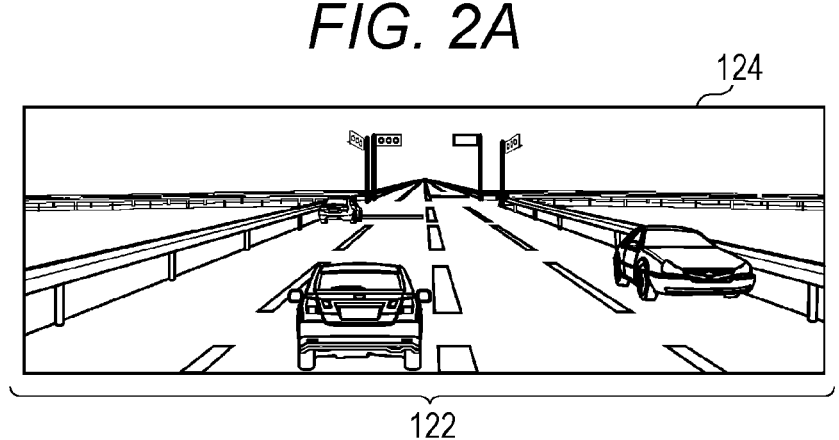
FIGS. 2A and 2B are explanatory diagrams for explaining a luminance image and a distance image.

An example of the present invention will be hereinafter explained in detail with reference to attached drawings. The size, materials, and other specific numerical values illustrated in the example are merely exemplification for the sake of easy understanding of the invention, and unless otherwise specified, they do not limit the present invention. In this specification and the drawings, elements having substantially the same functions and configurations are denoted with same reference numerals, and repeated explanation thereabout is omitted. Elements not directly related to the present invention are omitted in the drawings.

(Environment Recognition System 100)

FIG. 1 is a block diagram illustrating a connection relationship in an environment recognition system 100. The environment recognition system 100 includes multiple image capturing devices 110 (in this example, two image capturing devices 110) serving as onboard cameras, an image processing device 120, an exterior environment recognition device 130, and a vehicle control device 140, which are provided in a vehicle 1.

The image capturing device 110 includes an image element such as a charge-coupled device (CCD) and a complementary metal-oxide semiconductor (CMOS), and can obtain a color image, that is, luminance of three color phases (red: R, green: G, blue: B) per pixel. In this example, when color and luminance are treated equally, and both terms are included in the same text, they can be read luminance constituting color or color having luminance. In this case, color images taken by the image capturing devices 110 are referred to as luminance images, which are distinguished from a distance image to be explained later.

The image capturing devices 110 are disposed to be spaced apart from each other in a substantially horizontal direction so that optical axes of the two image capturing devices 110 are substantially parallel in a proceeding direction of the vehicle. The image capturing device 110 continuously generates image data obtained by capturing an image of a target object existing in front of the vehicle 1 on every frame at every 1/60 seconds (60 fps), for example. In this case, the target object may be not only independent three-dimensional objects such as a vehicle, a traffic light, a road, and a guardrail, but also illuminating portions such as a tail lamp, a turn signal, a traffic light that can be specified as portions of three-dimensional objects. Each later-described functional unit in the example below performs processing for each frame in response to the update of such image data.

The image processing device 120 obtains image data from each of the two image capturing devices 110, derives parallax using so-called pattern matching for searching a block corresponding to any block extracted from one of the image data pieces, from the other image data. The block is, for example, an array including four pixels in the horizontal direction and four pixels in the vertical direction). In this embodiment, the "horizontal" means the horizontal direction of the captured image and corresponds to the width direction inte real world, and the "vertical" means the vertical direction of the captured image, and corresponds the height direction in the real world.

One way of performing the pattern matching is to compare luminance values (Y color difference signals) between two pieces of image data per block indicating any image position. Examples include a Sum of Absolute Difference (SAD) obtaining a difference of luminance values, a Sum of Squared intensity Difference (SSD) squaring a difference and using the squared difference, and a Normalized Cross Correlation (NCC) adopting the degree of similarity of dispersion values obtained by subtracting a luminance mean value from a luminance value of each pixel. The image processing device 120 performs such parallax deriving processing per block on all the blocks appearing in the detection region (for example, 600 pixels by 180 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived per target object, but is independently derived in detection resolution units (for example, per block) in the detection region. In this embodiment, an image obtained by associating the parallax information thus derived (corresponding to a later-described relative distance) with image data is referred to as a distance image.

Figure 2B:
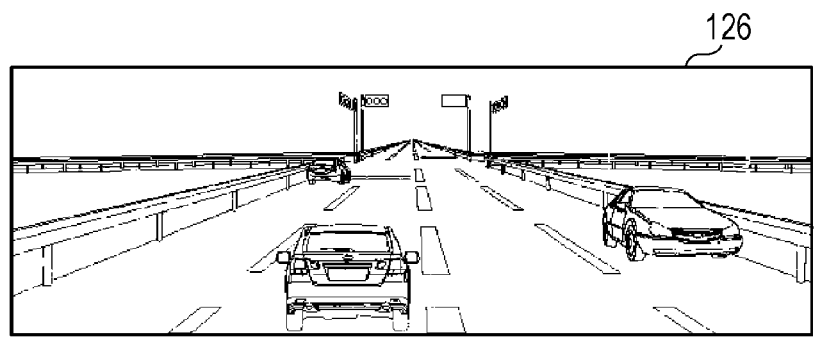

FIGS. 2A and 2B are explanatory diagrams for explaining a luminance image 124 and a distance image 126. For example, assume that the luminance image (image data) 124 as illustrated in FIG. 2A is generated with regard to a detection region 122 by the two image capturing devices 110. Here, for the sake of easy understanding, only one of the two luminance images 124 is schematically illustrated. In the this example, the image processing device 120 obtains a parallax for each block from such luminance image 124, and forms the distance image 126 as illustrated in FIG. 2B. Each block of the distance image 126 is associated with a parallax of the block. In the drawing, for the sake of explanation, a block from which a parallax is derived is indicated by a black dot.

The parallax can be easily specified at an edge portion (portion where there is a large contrast difference between adjacent pixels) of objects, and therefore, the block from which parallax is derived, which is denoted with black dots in the distance image 126, is likely to also be an edge in the luminance image 124. Therefore, the luminance image 124 as illustrated in FIG. 2A and the distance image 126 as illustrated in FIG. 2B are similar in terms of outline of each target object.

Back to FIG. 1, the exterior environment recognition device 130 obtains the luminance image 124 and the distance image 126 from the image processing device 120, and uses the luminance based on the luminance image 124 to determine which specific object the target object in the detection region 122 corresponds to. In addition, a relative distance of the vehicle 1 based on the distance image 126 is also used to identify the target object. In this example, the exterior environment recognition device 130 uses a so-called stereo method to convert the parallax information for each block in the detection region 122 of the distance image 126 into three-dimensional position information including a relative distance. The stereo method is a method using a triangulation method to derive a relative distance of a target object with respect to the image capturing device 110 from the parallax of the target object. The exterior environment recognition device 130 will be explained later in detail.

The vehicle control device 140 avoids a collision with the target object specified by the exterior environment recognition device 130 and performs control so as to maintain a safe distance from the preceding vehicle. More specifically, the vehicle control device 140 obtains a current cruising state of the vehicle 1 based on, for instance, a steering angle sensor 142 for detecting an steering angle and a vehicle speed sensor 144 for detecting the speed of the vehicle 1, thereby controlling an actuator 146 to maintain a safe distance from the preceding vehicle. The actuator 146 is an actuator for vehicle control used to control a brake, a throttle valve, the steering angle and the like. When collision with a target object is expected, the vehicle control device 140 displays a warning (notification) of the expected collision on a display 148 provided in front of a driver, and controls the actuator 146 to automatically decelerate the vehicle 1. The vehicle control device 140 can also be integrally implemented with the exterior environment recognition device 130.

Figure 3:
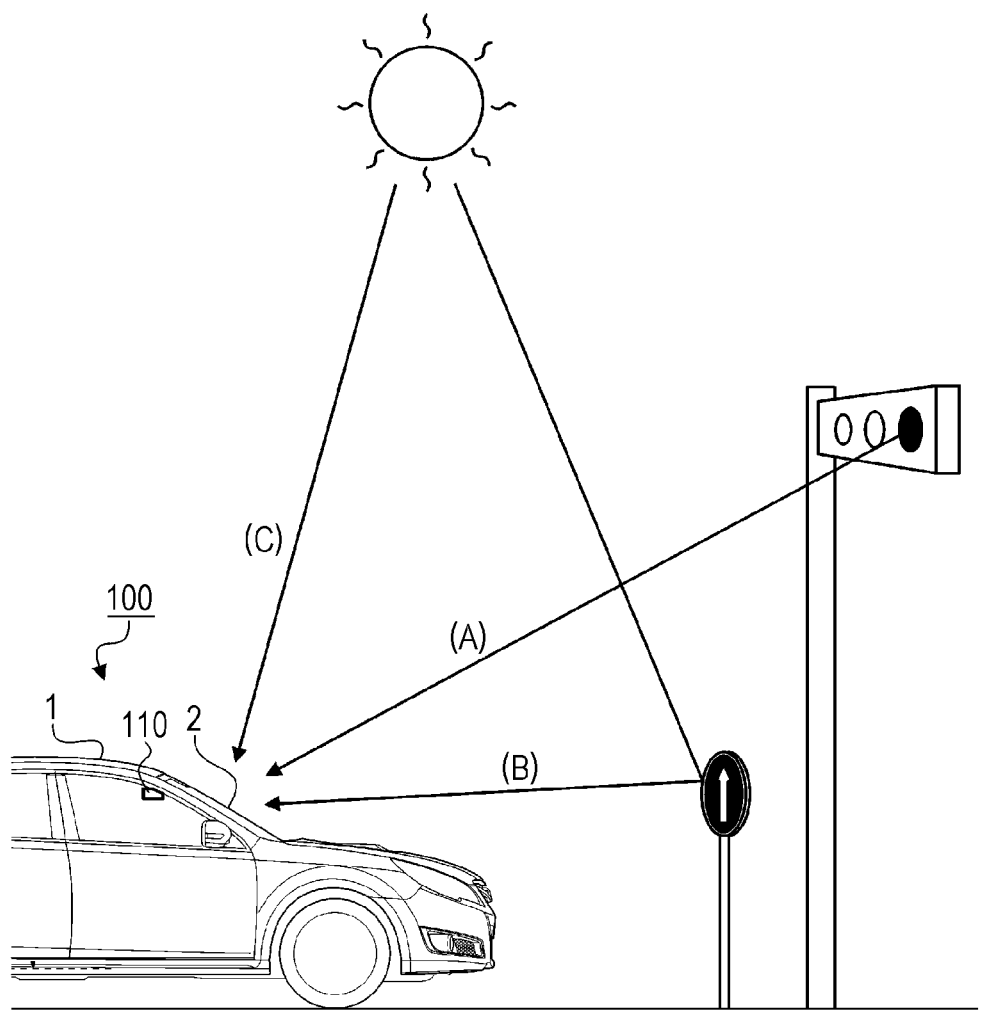
FIG. 3 is an explanatory diagram for explaining an effect of environment light in the environment recognition system.

FIG. 3 is an explanatory diagram for explaining an effect of environment light in the environment recognition system 100. As described above, in the environment recognition system 100, the image capturing device 110 generates the luminance image 124, and the exterior environment recognition device 130 uses the luminance based on the luminance image 124 to identify which specific object the target object in the detection region 122 corresponds to. Light of the light emission body indicated by arrow (A) in FIG. 3 and reflection light of an object as indicated by arrow (B) in FIG. 3 appear in the luminance image 124.

When the image capturing device 110 is provided in the vehicle 1, a transparent body 2 such as windshield exists in the image-capturing direction of the image capturing device 110, and the luminance image 124 is generated via the transparent body 2 by the image capturing device 110. Therefore, when the transparent body 2 is dirty or fogged, and the transparency is reduced. At this occasion, when strong environment light such as sunlight as indicated by arrow (C) in FIG. 3 is emitted from the image-capturing direction, the entire luminance image 124 thus captured is affected by the environment light, and, for instance, the environment light of arrow (C) is added to the light of the light emission body of arrow (A), which causes the target object in the luminance image 124 to have a color different from the original color.

It should be noted that this kind of phenomenon is not limited to the case where dirt or fog exits on the windshield, and the same can also be said when dirt or fog exists in the optical system of the lenses.

In this case, the original luminance of the target object can be reproduced by subtracting the effect due to the environment light of arrow (C), as the amount of correction, from the obtained luminance image 124. The amount of correction is obtained, for instance, as follows: Assuming that a specific object such as a road sign and a traffic light of which RGB ratio is identified in advance is detected, the amount of correction is obtained by subtracting the original luminance associated with the specific object from the luminance in the target portion corresponding to the specific object in the luminance image 124. Hereinafter, the specific configuration of the exterior environment recognition device 130 will be explained.

(Exterior Environment Recognition Device 130)

Figure 4:
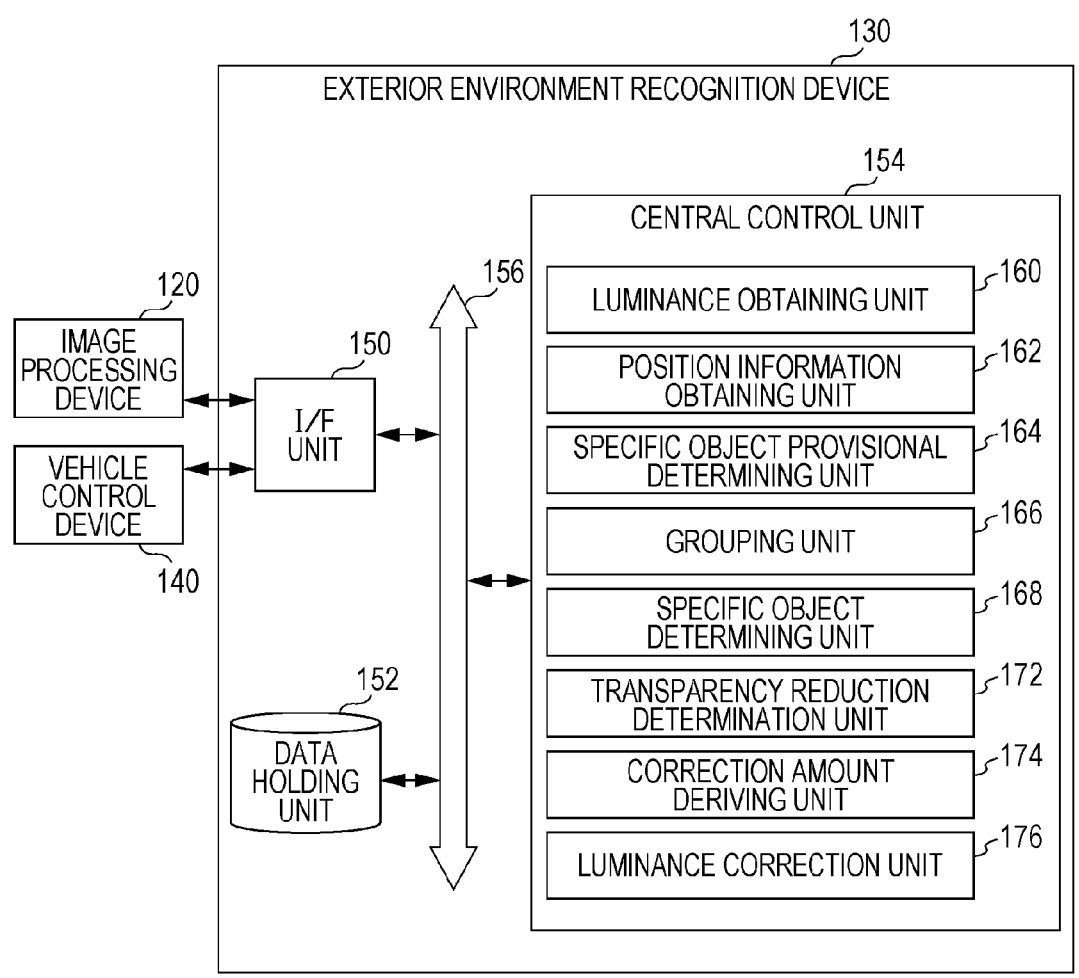
FIG. 4 is a functional block diagram schematically illustrating functions of the exterior environment recognition device.

FIG. 4 is a functional block diagram schematically illustrating functions of the exterior environment recognition device 130. As illustrated in FIG. 4, the exterior environment recognition device 130 includes an I/F unit 150, a data retaining unit 152, and a central control unit 154.

The I/F unit 150 is an interface for interactive information exchange with the image processing device 120 and the vehicle control device 140. The data retaining unit 152 is constituted by a RAM, a flash memory, an HDD and the like, and retains a specific object correspondence table, a dirt determination table, a correction reference table, and various kinds of information required for processing performed by each functional unit explained below. In addition, the data retaining unit 152 temporarily retains the luminance image 124 and the distance image 126 received from the image processing device 120. The specific object correspondence table, the dirt determination table, and the correction reference table are used as follows:

FIG. 5 is an explanatory diagram for explaining a specific object correspondence table 200, a dirt determination table 202, and a correction reference table 204. In this example, firstly, (1) the specific object correspondence table 200 is used to identify the specific object on the basis of the luminance image 124. Subsequently, (2) the dirt determination table 202 is used to determine whether or not the identified specific object is detected with dirt or fog. Then, (3) when it is determined that the identified specific object is detected with dirt or fog, the correction reference table 204 is used to derive the amount of correction which is a difference from the original luminance of the specific object. The amount of correction thus derived is applied to detection processing of another specific object in the same frame and detection processing of all the specific objects in the next frame and the frames subsequent thereto.

In the specific object correspondence table 200 as illustrated in FIG. 5A, multiple specific objects are associated with a luminance range 206 indicating a range of luminance representing color (color balance), a height range 208 indicating a range of height from the road surface, and a width range 210 indicating a range of size of the specific object. The specific objects include various objects required to be observed while the vehicle runs on the road, such as "traffic light (red)," "traffic light (blue)," "road sign (blue)," and "road sign (green)." It is to be understood that the specific object is not limited to the objects in FIG. 5A. Among the specific objects, for example, the specific object "traffic light (red)" adopts the luminance (R) as the reference value, and is associated with the luminance (G) which is 0.5 times or less of the reference value (R), the luminance (B) which is 0.38 times or less of the reference value (R), the height range 208 which is 4.5 to 7.0 m, and the width range 210 which is 0.05 to 0.2 m. The specific object "road sign (blue)" adopts the luminance (B) as the reference value, and is associated with the luminance (R) which is 0.7 times or less of the reference value (B), the luminance (G) which is 0.8 times or less of the reference value (B), the height range 208 which is 1.5 to 10.0 m, and the width range 210 which is 0.3 to 1.0 m.

Although not illustrated, each specific object is also associated with a condition unique to the specific object, for instance, information such as horizontal position, height, and the like with respect to the road. For instance, the specific objects "traffic light (red)" and "road sign (blue)" are associated with, for instance, information indicating that it is located within the road width in the horizontal direction of the distance image 126, the relative distance from the vehicle 1 is 40 to 70 m, the distance between target portions (variation) is within ±1 m, the distance between those other than the grouped target portions is 20 m or farther, and the number of target portions within the group is a predetermined number or equal to or more than a predetermined ratio. When the specific object "traffic light (red)" is constituted by LEDs, operation such as blinking explained later is associated, and the "road sign (blue)" is associated with, for example, information indicating that the size of area of the portion that can be determined to be blue is 50% or more of the entire size of area. In order to identify the specific object, various kinds of existing techniques can be used. For example, a technique disclosed in Japanese Unexamined Patent Application Publication (JP-A) No. 2009-72165 for identifying a specific object on the basis of the position of a light source in the real world can be used.

In this example, based on the specific object correspondence table 200, any target portion among the target portions in the luminance image 124 that satisfies the condition of the luminance range 206 with regard to any given specific object is adopted as a candidate for the specific object. For instance, when the luminances of the target portion are included in the luminance range 206 of the specific object "traffic light (red)" of the specific object correspondence table 200, the target portion may be adopted as the candidate for the specific object "traffic light (red)." Then, the target portions corresponding to the candidate "traffic light (red)" are grouped together to configure the target object. When the size of a grouped target object is included in the height range 4.5 to 7.0 m and the width range 0.05 to 0.2 m of the "traffic light (red)," and the condition unique to the "traffic light (red)" is satisfied, then it is determined to be the specific object "traffic light(red). The target portion determined to be the specific object is labeled with an identification number unique to the specific object. Pixels or a block made by collecting pixels may be used as the target portion. In this example, pixels are used as the target portions for the sake of convenience of explanation.

The dirt determination table 202 as illustrated in FIG. 5B is constituted by the same items as the specific object correspondence table 200, but is different in the luminance range 206. The dirt determination table 202 is designed to make a determination such that, on the basis of the luminance range 206 which is to be satisfied by the specific object unless the transparent body has dirt or fog, the range other than the luminance range 206 is determined to have dirt or fog. Therefore, for instance, the specific object "traffic light (red)" adopts the luminance (R) as the reference value, and is associated with the luminance (G) which is 0.35 times or more of the reference value (R) and the luminance (B) which is 0.2 times or more of the reference value (R). The dirt determination table is for the specific object detected using the specific object correspondence table 200 of FIG. 5A, and therefore, in combination with the condition of the specific object correspondence table 200, existence of dirt is determined when the luminance (G) is 0.35 times or more of the reference value (R) and is 0.5 times or less thereof or the luminance (B) is 0.2 times or more of the reference value (R) and is 0.38 times or less thereof, as a result.

The correction reference table 204 as illustrated in FIG. 5C is also different in the luminance range 206. The correction reference table 204 indicates the original luminance unique to the specific object. Therefore, it is used to derive a difference between the luminance of the specific object of which dirt is detected by using the dirt determination table 202 and the original luminance of the specific object, and the derived difference is used as amount of correction for correcting the luminance of the specific object.

Back to FIG. 4, the central control unit 154 is comprised of a semiconductor integrated circuit including, for instance, a central processing unit (CPU), a ROM storing programs, and a RAM serving as a work area, and controls an I/F unit 150 and the data retaining unit 152 through a system bus 156. In this example, the central control unit 154 also functions as a luminance obtaining unit 160, a position information obtaining unit 162, a specific object provisional determining unit 164, a grouping unit 166, a specific object determining unit 168, a transparency reduction determination unit 172, a correction amount deriving unit 174, and a luminance correction unit 176. In this embodiment, the position information obtaining unit 162, the specific object provisional determining unit 164, the grouping unit 166, and the specific object determining unit 168 function as the specific object detection unit for detecting the specific object from the luminance image 124 on the basis of the specific object correspondence table 200.

The luminance obtaining unit 160 obtains luminances by target portion (pixels) (luminances of three color phases (red (R), green (G), and blue (B)) per pixel) from the received luminance image 124. When the later-described luminance correction unit 176 corrects the luminance, the corrected correction luminance is obtained.

The position information obtaining unit 162 uses the stereo method to convert parallax information for each block in the detection region 122 of the distance image 126 received into three-dimensional position information including the width direction x, the height direction y, and the depth direction z. The parallax information represents a parallax of each target portion in the distance image 126, whereas the three-dimensional position information represents information about the relative distance of each target portion in the real world. Accordingly, a term such as the relative distance and the height refers to a distance in the real world, whereas a term such as a detected distance refers to a distance in the distance image 126. When the parallax information is not derived per pixel but is derived per block, a calculation may be executed per pixel with the parallax information being deemed as parallax information about all the pixels which belong to a block.

Figure 6:
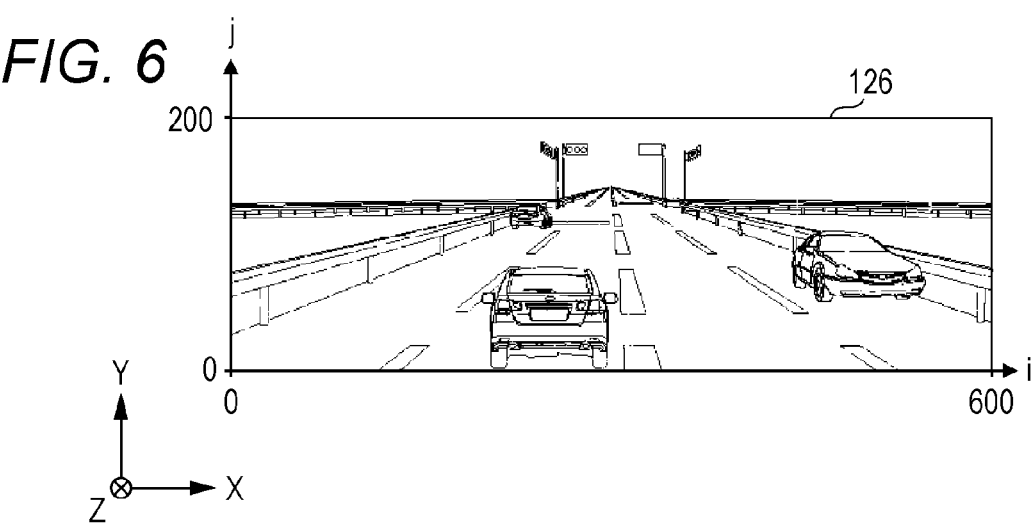
FIG. 6 is an explanatory diagram for explaining conversion into three-dimensional position information by a position information obtaining unit.

FIG. 6 is an explanatory diagram for explaining conversion into three-dimensional position information by the position information obtaining unit 162. First, the position information obtaining unit 162 treats the distance image 126 as a coordinate system in a pixel unit as illustrated in FIG. 6. In FIG. 6, the lower left corner is adopted as an origin (0, 0). The horizontal direction is adopted as an i coordinate axis, and the vertical direction is adopted as a j coordinate axis. Therefore, a pixel having a parallax dp can be represented as (i, j, dp) using a pixel positions i, j and the parallax dp.

The three-dimensional coordinate system in the real world according to this example will be considered using a relative coordinate system in which the vehicle 1 is located in the center. The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and a vertical line passing through the center of two image capturing devices 110 is denoted as an origin (0, 0, 0). When the road is assumed to be a flat plane, the road surface matches the X-Z plane (y=0). The position information obtaining unit 162 uses numerical expressions (1) to (3) shown below to transform the coordinate of the pixel (i, j, dp) in the distance image 126 into a three-dimensional point (x, y, z) in the real world.

$$x = CD/2 + z \cdot PW \cdot (i - IV) \quad (1)$$

$$y = CH + z \cdot PW \cdot (j - JV) \quad (2)$$

$$z = KS/dp \quad (3)$$

Here, CD denotes an interval (baseline length) between the image capturing devices 110, PW denotes a corresponding distance in the real world to a distance between adjacent pixels in the image, so-called like an angle of view per pixel CH denotes an disposed height of the image capturing device 110 from the road surface, IV and JV denote coordinates (pixels) in the image at an infinity point in front of the vehicle 1, and KS denotes a distance coefficient (KS=CD/PW).

Accordingly, the position information obtaining unit 162 derives the height from the road surface on the basis of the relative distance of the target portion and the detection distance in the distance image 126 between a point on the road surface located at the same relative distance as the target portion and the target portion.

The specific object provisional determining unit 164 provisionally determines a specific object on the basis of the luminance (or the correction luminance) obtained by luminance obtaining unit 160 by referring to the specific object correspondence table 200 retained in the data retaining unit 152.

More specifically, the specific object provisional determining unit 164 sequentially selects any given specific object from the specific objects registered in the specific object correspondence table 200, and determines whether the obtained luminances are included in the luminance range 206 of the specific object sequentially selected. Then, when the luminances are determined to be in the target luminance range 206, an identification number representing the specific object is assigned to the target portion, so that a specific object map is generated.

The specific object provisional determining unit 164 sequentially executes a series of comparisons between the luminances of the target portions and the luminance ranges 206 of the specific objects registered in the specific object correspondence table 200. The order of selecting the specific objects in the specific object table 200 as explained above also shows the order of priority. That is, in the specific object correspondence table 200 of FIG. 5A, the comparison processing is executed in the following order: "traffic light (red)," "traffic light (blue)," "road sign (blue)," "road sign (green)."

When the comparison is performed according to the above order of priority, and as a result, the luminances of the target portion are determined to be included in the luminance range 206 of a specific object of a high order of priority, the comparison processing is no longer performed for specific objects of a lower order of priority. Therefore, only one identification number representing one specific object is assigned. This is because multiple specific objects do not overlap in the real world, and thus a target object that is once determined to be any given specific object is no longer determined to be another specific object. By exclusively treating the target portions in this manner, it is possible to avoid redundant specifying processing for the same target portion that is already provisionally determined to be a specific object, and the processing load can be reduced.

Figure 7:
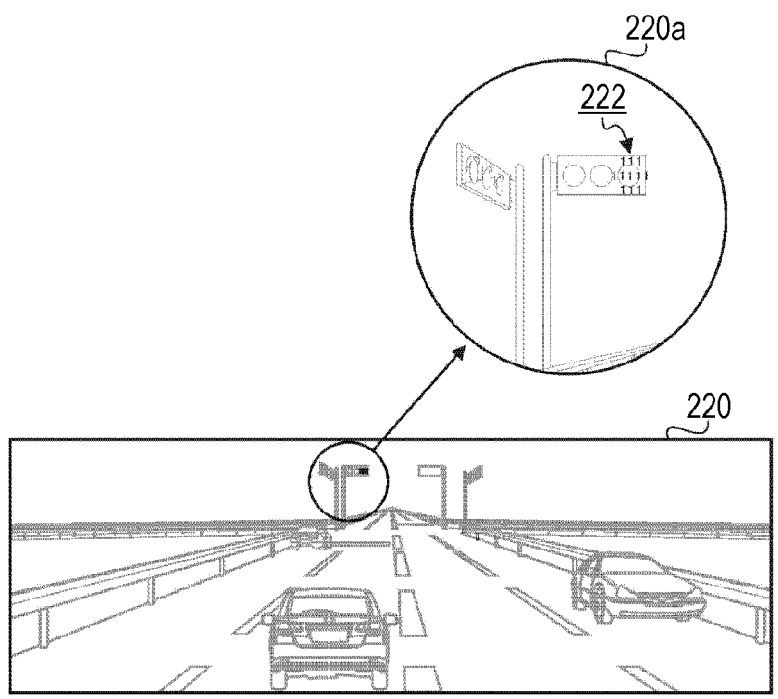
FIG. 7 is an explanatory diagram for explaining a specific object map.

FIG. 7 is an explanatory diagram for explaining a specific object map 220. The specific object map 220 is made by overlaying the identification numbers of the specific objects on the luminance image 124, and the identification number of the specific object is assigned to a position corresponding to the target portion provisionally determined to be the specific object.

For instance, in a segment 220a of the specific object map 220, the luminances of target portions 222 corresponding to the light-emitting portions at the right side of the traffic light are included in the luminance range 206 of the specific object "traffic light (red)," and therefore, an identification number "1" of the specific object "traffic light (red)" is assigned. FIG. 7 illustrates a figure in which identification number "1" is assigned to multiple target portions 222 of the luminance image 124. This is, however, a conceptual representation for the sake of easy understanding. In reality, identification number "1" is registered as data at the target portions 222.

The grouping unit 166 adopts any given target portion provisionally determined as a base point, and groups the relevant target portions provisionally determined to correspond to a same specific object (attached with a same identification number) of which position differences in the width direction x and in the height direction y are within a predetermined range, thereby making the grouped target portions into a target object. The predetermined range is represented as a distance in the real world, and can be set at any given value (for example, 1.0 m). The grouping unit 166 also groups target portions which are newly added through the grouping processing as a base point and groups the relevant target portions which are provisionally determined to correspond to a same specific object and of which position differences in the width direction x and in the height direction y are within a predetermined range. Consequently, as long as the distance between the target portions provisionally determined to be the same specific object is within the predetermined range, all of such target portions are grouped.

In this case, the grouping unit 166 makes the determination using the distance in the with direction x and the distance in the height direction y in the real world, but it may also be possible to use the luminance image 124 and the distance image 126 and make a determination using the detection distance (for example, the number of pixels) on the luminance image 124 and the distance image 126. In this case, without deriving the distance in the with direction x and the distance in the height direction y in the real world, for instance, the determination as to whether or not it is within a predetermined range is made on the basis of only the number of pixels. Note that, in this case, the threshold value of the predetermined range for grouping is changed according to the relative distance of the target portion. As illustrated in FIG. 2 and the like, distant objects and close objects are represented in the flat plane in the luminance image 124 and the distance image 126, and therefore, an object located at a distant position is represented in a small (short) size and an object located at a close position is represented in a large (long) size. Therefore, for example, the threshold value of the predetermined range in the luminance image 124 and the distance image 126 is set at a small value for a distant target portion, and set at a large value for a close target portion. Therefore, even when the detection distances are different between a distant position and a close position, the threshold value can beset appropriately, and the grouping processing can be stably performed.

In addition to the difference in the width direction x and the difference in the height direction y explained above, the grouping unit 166 may group target portions of which relative-distance difference in the depth direction z is within a predetermined range and which are provisionally determined to correspond to a same specific object. In the real world, even when target portions are close to each other in the width direction x and in the height direction y, the positions (relative distances) in the depth direction z thereof may be greatly different. In such case, the target portions belong to different target objects. Therefore, when any one of the difference of positions in the width direction x, the difference of positions in the height direction y, and the difference of positions (relative distances) in the depth direction z is greatly different, the group of the target portion may be deemed as an independent target object. In so doing, it is possible to perform highly accurate grouping processing.

In the above description, each of the difference in the width direction x, the difference in the height direction y and the difference in the depth direction z is independently determined, and only when all of them are included within the predetermined range, the target portions are grouped into the same group. However, grouping processing may be performed using another calculation. For example, when a square mean value √ of the difference in the width direction x, the difference in the height direction y, and the difference in the depth direction z ((difference in the width distance x)$^2$+ (difference in the height direction y)$^2$+(difference in the depth direction z)$^2$) is included within a predetermined range, target portions may be grouped into the same group. With such calculation, distances between target portions in the real world can be derived accurately, and therefore, grouping accuracy can be enhanced.

When a target object made as a result of grouping processing by the grouping unit 166 satisfy a predetermined condition such as the height range 208 and the width range 210, the specific object determining unit 168 determines that the target object is a specific object. For example, as illustrated in FIG. 5A, when the height range 208 is associated with the specific object correspondence table 200, and the height y with respect to the road of the target object is included in the height range 208 of a specific object provisionally determined with regard to the target object on the basis of the specific object correspondence table 200, the specific object determining unit 168 determines that the target object as the specific object. When the width range 210 is additionally associated, then, the specific object determining unit 168 can make a determination as follows: when the size of the target object (any one of the distance in the width direction x and the distance in the width direction y of the target object) is included in the width range 210 of the specific object provisionally determined with regard to the target object on the basis of the specific object correspondence table 200, the specific object determining unit 168 determines that the target object is the specific object. It may also be possible to set the width range 210 for each of the distance in the width direction x and the distance in the width direction y of the target object. In this case, it is confirmed that the target object is of a position and a size adequate to be deemed as a specific object.

When information unique to the specific object such as horizontal position, height, and the like with respect to the road is also associated with each specific object, the specific object determining unit 168 may determine the specific object only when the condition is satisfied. For instance, when a candidate of the specific object is the "road sign (blue)," then it is determined whether the following conditions are satisfied: the horizontal position with respect to the road is located within the road width in the horizontal direction of the distance image 126 and the horizontal distance x from the vehicle 1 is 40 m to 70 m; the distance other than the grouped target portion is 20 m or longer; the number of target portions in the group is equal to or larger than a predetermined number or a predetermined ratio; and the size of area of the portion that can be determined to be blue is 50% or more of the entire size of area.

When the specific object has other features, the specific object may be determined using the features as the condition. For instance, the "traffic light (red)" is constituted by light emitting diodes (LEDs) or lamps, and when it is constituted by LEDs, the LEDs are blinking at a cycle that cannot be perceived by the human eyes (for example, 100 Hz). Therefore, the specific object determining unit 168 can determine the specific object "traffic light (red)" on the basis of temporal change of the luminance of the target portion in the luminance image 124 obtained without synchronization with the blinking timing of the LEDs.

The transparency reduction determination unit 172 compares the luminance of the target portion corresponding to the specific object determined (detected) and the luminance range 206 associated with the specific object with the dirt determination table 202, and determines a reduction in transparency (dirt or fog) of the transparent body 2 located in the image-capturing direction (the image-capturing direction of the image capturing device 110) of the luminance image 124.

Figure 8:
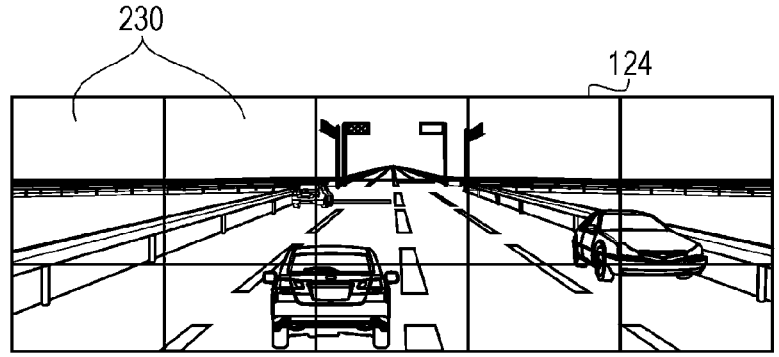
FIG. 8 is an explanatory diagram for explaining a determination target of a transparency reduction determination unit.

FIG. 8 is an explanatory diagram for explaining a determination target of the transparency reduction determination unit 172. The transparency reduction determination unit 172 determines the reduction in transparency of the transparent body 2 for each divided region obtained by dividing the luminance image 124 (detection region 122) into multiple regions. In this example, for instance, as illustrated in FIG. 8, divided regions 230 are set by equally dividing the luminance image 124 into five regions in the horizontal direction and equally dividing the luminance image 124 into three regions in the vertical direction. In this example, the luminance image 124 is divided into 5-by-3 regions, but the number of regions divided may be set to any number, including zero. In this example, the luminance image 124 is equally divided in the horizontal direction and the vertical direction, but it may be divided into various sizes. For instance, the size of area of the central divided region 230 of the luminance image 124 may to be smaller than that at the end portion side.

When, for each divided region 230, the luminance of the target portion corresponding to the determined specific object is included in the luminance range 206 associated with the specific object in the dirt determination table 202, then the transparency reduction determination unit 172 determines that the transparency of the transparent body 2 corresponding to the divided region 230 including the target portion is reduced. For instance, even if the specific object provisional determining unit 164 determines that the specific object "road sign (blue)" is included in the luminance range 206 on the basis of the specific object correspondence table 200, the transparency of the transparent body 2 is determined to be reduced when the luminance is included in the luminance range 206 of the dirt determination table 202.

As described above, by dividing the luminance image 124 into multiple divided regions 230, reduction in the transparency of the transparent body 2 can be determined independently with a fine range, and this can prevent correction of the luminance even in a divided region 230 of which transparency has not been reduced.

Instead of the transparency reduction determination unit 172, it is also be possible to use a transparency reduction detection unit that detects, with hardware, a reduction in the transparency of the transparent body 2 located in the image-capturing direction of the luminance image 124. Various kinds of existing technique can be used for such detection unit.

When the transparency reduction determination unit 172 and the transparency reduction detection unit detect a reduction in the transparency of the transparent body 2, the correction amount deriving unit 174 looks up the correction reference table 204, derives the amount of correction on the basis of difference between the luminance of the target portion of the luminance image 124 associated with the specific object determined (detected) and the luminance associated with the specific object in the correction reference table 204.

Like the transparency reduction determination unit 172, the correction amount deriving unit 174 also derives the amount of correction per divided region 230 obtained by dividing the luminance image 124 (detection region 122) into multiple regions. By deriving the amount of correction for each of the multiple divided regions 230, the luminance can be appropriately corrected for each of the divided regions 230.

Figure 9:
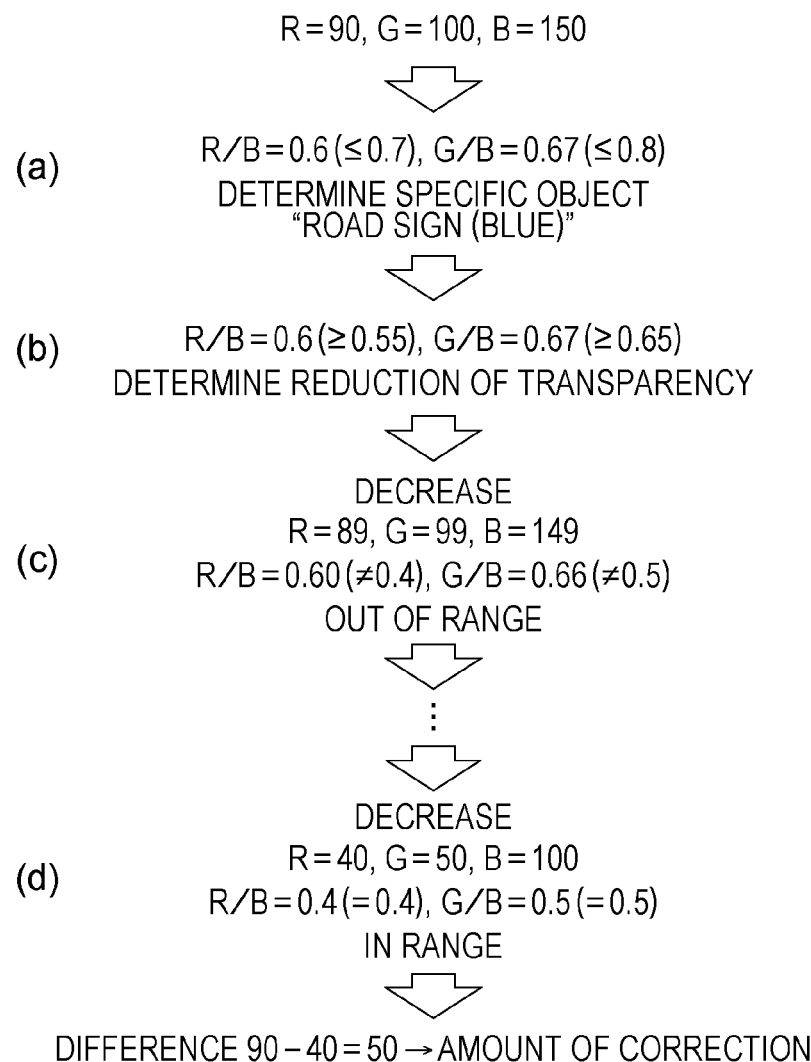
FIG. 9 is an explanatory diagram for explaining processing of a correction amount deriving unit.

FIG. 9 is an explanatory diagram for explaining processing of the correction amount deriving unit 174. For example, suppose a case where the luminances of any given target portion obtained by the luminance obtaining unit 160 are R=90, G=100, and B=150, and a close target object to the target portion is determined to be the specific object "road sign (blue)" on the basis of the specific object correspondence table 200.

In this case, as illustrated in FIG. 9A, the range of the specific object "road sign (blue) in the specific object correspondence table 200, that is, the reference value, is the luminance (B), and the luminance (R) is 0.6 times of the reference value (B), and the luminance (G) is 0.67 times of the reference value (B), the conditions "R≤B×0.7," "G≤B×0.8" are satisfied. However, as illustrated in FIG. 9B, the luminances of the target portion are such that the range of the "road sign (blue)" in the dirt determination table 202, that is, the reference value is the luminance (B), and the luminance (R) is 0.55 times or more of the reference value (B), and the luminance (G) is 0.65 times or more of the reference value (B). Therefore, the transparency reduction determination unit 172 determines that, in the divided region 230 including the target object, the transparency of the transparent body 2 is reduced.

Following the determination of the transparency reduction determination unit 172, the correction amount deriving unit 174 derives the amount of correction. Firstly, the correction amount deriving unit 174 reduces the luminances of each color of the target portion by −1 in a range where the calculation result is 0 to 255, and a difference from a value when the result is the same as the luminance of the "road sign (blue)" of the correction reference table 204 is adopted as the amount of correction.

For instance, as illustrated in FIG. 9C, the luminances R=89, G=99, B=149 obtained by reducing the luminances of the target portion R=90, G=100, B=150 have not yet reached the luminancse of the "road sign (blue)" of the correction reference table 204. However, as illustrated in FIG. 9D, when the luminances R=40, G=50, B=100 are reduced 50 times, R/B becomes 0.4, and G/B becomes 0.5, and this matches the luminances of the "road sign (blue)" in the correction reference table 204. In this case, the amount of correction is 50 which is the difference.

When there are multiple luminances of the target as described above, the difference when any one of them satisfies the condition may be adopted as the amount of correction, or the difference when both of them are less than the condition (for example, in the case of the "road sign (blue)," R/B<0.4, G/B<0.5, and in the case of the "traffic light (red)," G/R<0.25, B/R<0.1") may be adopted as the amount of correction.

When the luminances are reduced until both of them are less than the condition, any one of the luminances becomes a negative value, the difference of the luminances when the absolute value of the average (central value) of differences between the luminances (ratio) when the luminances of the target portion are reduced and the luminances (ratio) of the correction reference table 204 are the minimum may be adopted as the amount of correction. Hereinafter, details will be described using the specific object "traffic light (red)" as an example.

FIG. 10 is another explanatory diagram for explaining processing of the correction amount deriving unit 174. For instance, suppose that the luminances of any given target portion obtained by the luminance obtaining unit 160 are R=120, G=45, B=18, and a target object in proximity to the target portion is determined to be the specific object "road sign (red)" on the basis of the specific object correspondence table 200.

In this case, as illustrated in FIG. 10A, the range of the specific object "road sign (red)" in the specific object correspondence table 200, that is, the reference value, is the luminance (R), and the luminance (G) is 0.375 times of the reference value (R), and the luminance (B) is 0.15 times of the reference value (R), the conditions "G≤R×0.5," "B≤R×0.38" are satisfied. However, as illustrated in FIG. 10B, the luminances of the target portion are such that the range of the "traffic light (red)" in the dirt determination table 202, that is, the reference value is the luminance (R), and the luminance (G) is 0.35 times or more of the reference value (R). Therefore, the transparency reduction determination unit 172 determines that, in the divided region 230 including the target object, the transparency of the transparent body 2 is reduced.

Upon the determination of the transparency reduction determination unit 172, the correction amount deriving unit 174 derives the amount of correction. Firstly, the correction amount deriving unit 174 reduces the luminances of each color of the target portion by −1 in a range where the calculation result is 0 to 255, and tries so that the result becomes the same as the luminances of the "traffic light (red)" of the correction reference table 204, that is, "G=R×0.25," "B=R×0.1."

However, when the luminances are reduced by one, both of the conditions should be satisfied at the same time, but when one of them satisfies the condition, the other of them may not necessarily satisfy the condition. Accordingly, the correction amount deriving unit 174 may adopt, as the amount of correction, the difference of the luminances when the absolute value of the average of the difference between the luminances obtained by reducing the luminances of the target portion and the luminances of the correction reference table 204 is the minimum.

For example, the absolute value of the average of the difference from the luminances of the correction reference table 204 gradually decreases due to decrement, and when the luminances of the target portion obtained through decrement are R=108, G=33, B=6 as illustrated in FIG. 10C, then the absolute value of the average of the difference from the luminances of the correction reference table 204 becomes 0.006. Likewise, as illustrated in FIG. 10D, when the luminancse of the target portion obtained through decrement re R=107, G=32, B=5, the absolute value of the average of the difference from the luminances of the correction reference table 204 becomes 0.002, and when the luminances of the target portion obtained through decrement are R=106, G=31, B=4 as illustrated in FIG. 10E, the absolute value of the average of the difference from the luminances of the correction reference table 204 becomes 0.010. The absolute value of the average of the difference from the luminances of the correction reference table 204 gradually increases due to decrement. That is, the absolute value 0.002 of the average of the difference from the luminances of the correction reference table 204 where R=107, G=32, B=5 are the minimum values, and the amount of correction at this moment is 13 which is the difference from the luminance before the decrement.

As described above, the amount of correction is derived, but as described with reference to FIG. 3, the change in the luminances is caused by the effect of the environment light of arrow (C). The effect of the environment light is represented by a product of the transparency and the intensity of the incident light (such as sunlight). The transparency is in accordance with dirt or fog on the transparent body 2, and the value thereof is substantially a fixed value, but the intensity of the incident light is changed in a proportional manner in accordance with the exposure time of the image capturing device 110.

Therefore, when the correction amount deriving unit 174 derives the amount of correction, the exposure time when the amount of correction is derived is obtained, and derives the basic amount of correction (corresponding to the transparency) obtained by dividing the amount of correction by the exposure time. The value obtained by multiplying the basic amount of correction by the exposure time of luminance image 124 of the correction target is the amount of correction of the luminance image 124 of the correction target.

As described above, the correction amount deriving unit 174 derives the amount of correction per divided region 230. The amount of correction derives when there is a specific object in a divided region 230. Therefore, when there is no specific object in a divided region 230, the correction is not made even if the transparency of the transparent body 2 is reduced. Therefore, when there are not only a divided region 230 for which the amount of correction is derived but also a divided region 230 for which the amount of correction is not derived in a mixed manner, the correction amount deriving unit 174 derives the amount of correction of the divided region 230 for which the amount of correction is not derived, on the basis of the amount of correction of the divided region 230 for which the amount of correction is derived. For instance, the correction amount deriving unit 174 averages the amounts of corrections of one or more divided regions 230 for which the amount of correction is derived, and adopts the average value as the amount of correction of the divided region 230 for which the amount of correction is not derived. However, the derived average value is not reflected in the divided region 230 for which the amount of correction is derived.

When the entire transparent body 2 is dirty or fogged, only a portion of the divided region 230 is not corrected, and the above configuration can prevent the identifying accuracy of the specific object from reducing.

The amount of correction changes over time and changes greatly. Accordingly, the correction amount deriving unit 174 derives the time average value of the amount of correction derives this time and the amount of correction previously derived in the same detection region 122 or the same divided region 230, and adopts the time average value as the amount of correction again. The time average value may be a value obtained by simply averaging the amount of correction derived this time and the previously derived amount of correction for a predetermined number of times, or a value derived by one or more degrees of low pass filters (LPFs) having predetermined time constants.

With such configuration, the change of the amount of correction over time can be alleviated, and the change of the amount of correction can be suppressed.

The luminance correction unit 176 corrects the luminance image 124 on the basis of the amount of correction derived. As described above, the corrected luminance image is used to identify a specific object other than the specific object used for calculating the amount of correction (for instance, when a calculation is performed on the basis of the luminance information about the road sign (blue), the corrected luminance image is used to identify a specific object other than the road sign (blue), such as tail lamps and a traffic light). In the next frame and frames subsequent thereto, the luminance correction unit 176 corrects the received luminance image 124 on the basis of the amount of correction, and causes the luminance obtaining unit 160 to obtain the corrected correction luminance. Such luminance correction may be executed either constantly or only when the transparency reduction determination unit 172 and the transparency reduction detection unit detects reduction in the transparency of the transparent body 2.

Like the transparency reduction determination unit 172, the luminance correction unit 176 also corrects the luminance per divided region 230 obtained by dividing the luminance image 124 (the detection region 122) into multiple regions. As described above, the luminance can be appropriately corrected for each of the multiple divided regions 230. In this example, the amount of correction for the divided region 230 for which the amount of correction is not derived is also derived on the basis of the divided region 230 for which the amount of correction is derived, and the luminance of the divided region 230 is corrected, but it is possible not to correct at all the divided region 230 for which the amount of correction is not derived.

As described above, the correction amount deriving unit 174 derives the basic amount of correction obtained by dividing the amount of correction by the exposure time when the amount of correction is derived. Therefore, the luminance correction unit 176 performs correction on the basis of the amount of correction obtained by multiplying the basic amount of correction derived by the correction amount deriving unit 174 by the exposure time of the luminance image 124 of the correction target. In this manner, regardless of the change of the exposure time, the luminance can be appropriately corrected.

Therefore, the exterior environment recognition device 130 can extract, from the luminance image 124, one or more target objects as specific objects, and the information can be used for various kinds of controls. For instance, when the specific object "traffic light (red)" is extracted, this indicates that the target object is a fixed object that does not move, and when the target object is a traffic light for the driver's vehicle, this indicates that the vehicle 1 has to stop or decelerate. For another instance, which is not described in the above, the existence of a preceding vehicle running together with the vehicle 1 can be recognized by extracting a specific object "tail lamp (red)."

(Environment Recognition Method)

Hereinafter, the specific processing performed by the exterior environment recognition device 130 will be explained with reference to the flowchart of FIGS. 11 to 16. FIG. 11 illustrates an overall flow of interrupt processing when the image processing device 120 transmits the distance image (parallax information) 126. FIGS. 12 to 16 illustrate subroutines therein. In this description, pixels are used as target portions, and the lower left corners of the luminance image 124 and the distance image 126 are origins. The processing is performed according to the environment recognition method in a range of 1 to 600 pixels in the horizontal direction of the image and 1 to 180 pixels in the vertical direction of the image. In this description, divided regions 230 with five regions in the horizontal direction by three regions in the vertical direction are prepared, and each divided region 230 has horizontal 120 pixels by 60 pixels. The number of target specific objects to be checked is considered to be four.

As illustrated in FIG. 11, when an interrupt occurs according to the environment recognition method in response to reception of the distance image 126, the luminance image 124 obtained from the image processing device 120 is referred to, and a specific object map 220 is generated on the basis of the target object correspondence table 200 (S300). With the specific object map 220, the specific objects provisionally determined are made into a group (S302), and the grouped target objects are determined as a specific object (S304).

Subsequently, reduction in the transparency of the transparent body 2 in the image-capturing direction of the luminance image 124 is examined (S308), and when the amount of correction of the target portion of the luminance image 124 is derived (S310), the luminances of the target portion of the luminance image 124 are corrected on the basis of the amount of correction derived (S312). At this occasion, the luminance correction unit 176 performs correction on the basis of the amount of correction obtained by multiplying the basic amount of correction derived by the correction amount deriving unit 174 by the exposure time of the luminance image 124 of the correction target. Hereinafter, the processing will be explained in a more specific manner.

(Specific Object Map Generating Processing S300)

Figure 12:
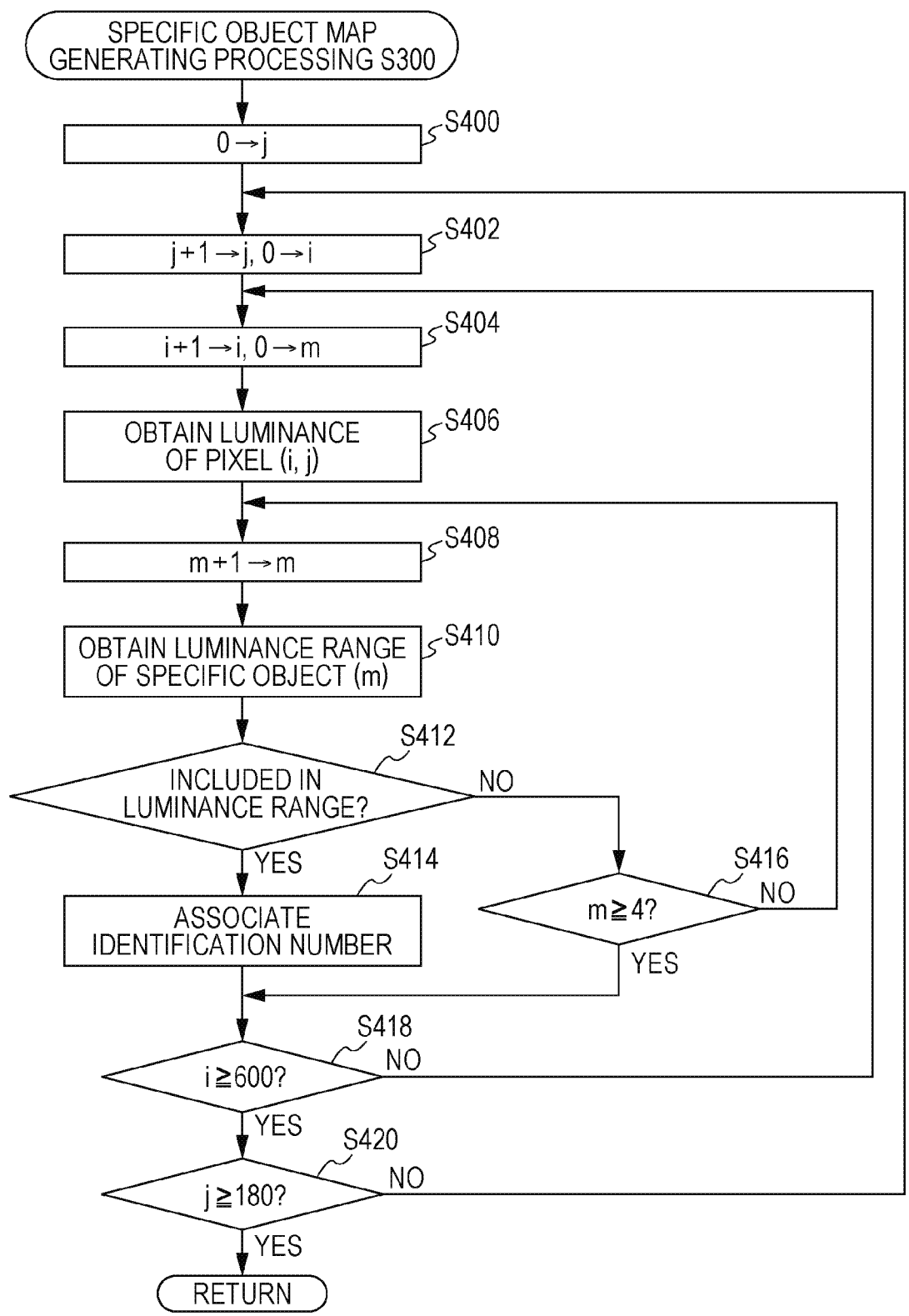
FIG. 12 is a flowchart illustrating a flow of specific object map generating processing.

As illustrated in FIG. 12, the specific object provisional determining unit 164 initializes (substitutes "0" to) a vertical variable j for specifying a target portion (pixel) (S400). Subsequently, the specific object provisional determining unit 164 adds "1" to (increments by 1) the vertical variable j, and initializes (substitutes "0" to) a horizontal variable i (S402). Then, the specific object provisional determining unit 164 adds "1" to the horizontal variable i, and initializes (substitutes "0" to) a specific object variable m (S404). Here, the horizontal variable i and the vertical variable j are provided to execute the specific object map generating processing on all of the 600 by 180 pixels, and the specific object variable m is provided to sequentially compare four specific objects for each pixel.

The specific object provisional determining unit 164 causes the luminance obtaining unit 160 to obtain the luminance of the pixel (i, j) as a target portion from the luminance image 124 (S406), adds "1" to the specific object variable m (S408), obtains the luminance range 206 of the specific object (m) (S410), and determines whether or not the luminances of the pixel (i, j) are included in the luminance range 206 of the specific object (m) (S412).

When the luminances of the pixel (i, j) are included in the luminance range 206 of the specific object (m) (YES in S412), the specific object provisional determining unit 164 assigns an identification number p representing the specific object (m) to the pixel so as to be expressed as the pixel (i, j, p) (S414). In this manner, the specific object map 220 is generated, in which an identification number p is given to each pixel in the luminance image 124. When the luminances of the pixel (i, j) are not included in the luminance range 206 of the specific object (m) (NO in S412), a determination is made as to whether or not the specific object variable m is equal to more than 4, which is the maximum number of specific objects (S416). When the specific object variable m is less than the maximum value (NO in S416), the processing is repeated from the increment processing of the specific object variable m in step S408. When the specific object variable m is equal to or more than the maximum value (YES in S416), which means that there is no specific object corresponding to the pixel (i, j), and the processing in step S418 subsequent thereto is performed.

Then, the specific object provisional determining unit 164 determines whether or not the horizontal variable i is equal to or more than 600, which is the maximum value of the pixel number in the horizontal direction (S418), and when the horizontal variable i is less than the maximum value (NO in S418), the processing is repeated from the increment processing of the horizontal variable i in step S404. When the horizontal variable i is equal to or more than the maximum value (YES in S418), the specific object provisional determining unit 164 determines whether or not the vertical variable j is equal to or more than 180, which is the maximum value of the pixel in the vertical direction (S420). Then, when the vertical variable j is less than the maximum value (NO in S420), the processing is repeated from the increment processing of the vertical variable j in step S402. When the vertical variable j is equal to or more than the maximum value (YES in S420), the specific object map generating processing S300 is terminated. Therefore, the specific object corresponding to each pixel is provisionally determined.

(Grouping Processing S302)

Figure 13:
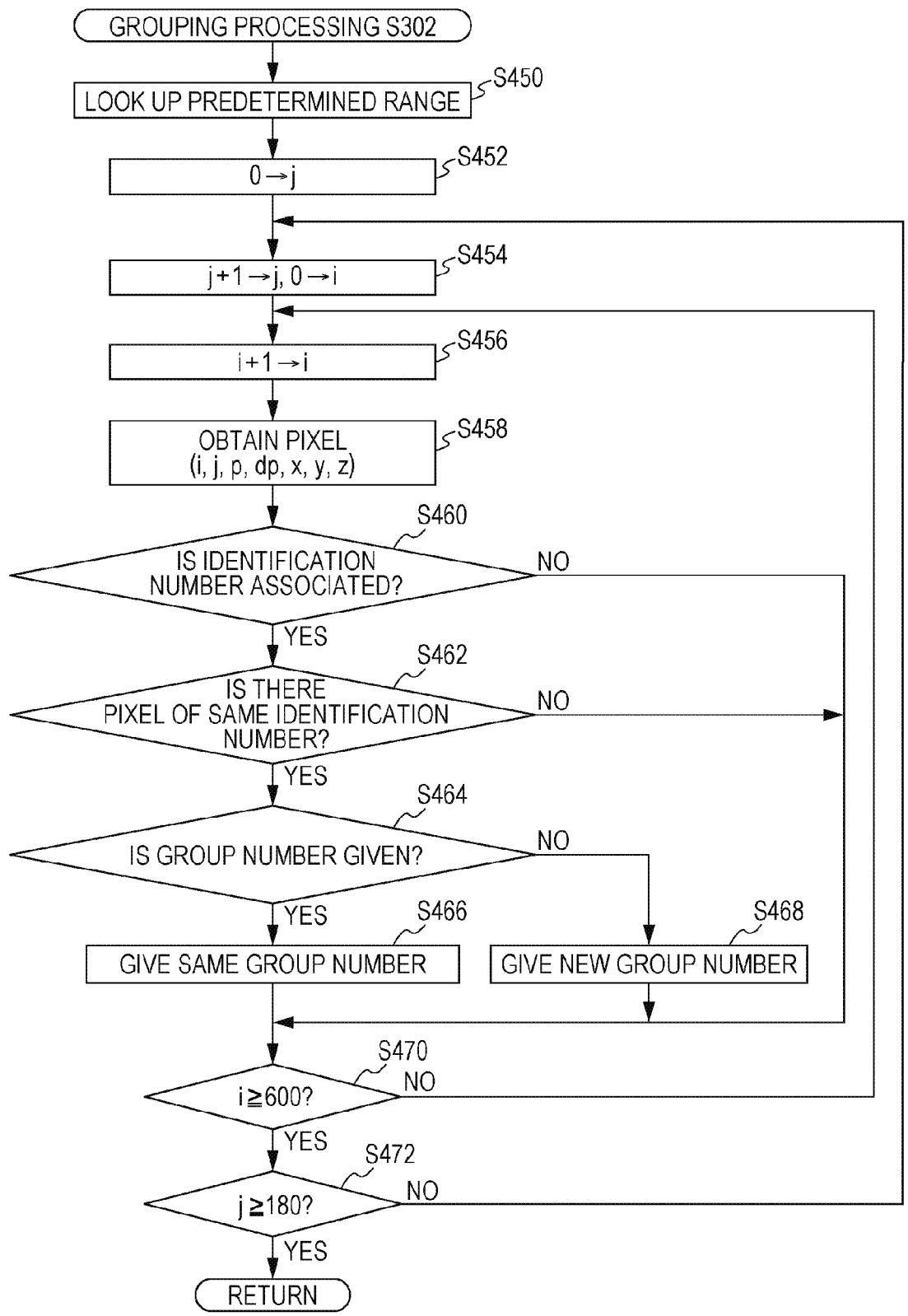
FIG. 13 is a flowchart illustrating a flow of grouping processing.

As illustrated in FIG. 13, the grouping unit 166 refers to the predetermined range to group the target portions (S450), and initializes (substitutes "0" to) the vertical variable j for specifying a target portion (pixel) (S452). Subsequently, the grouping unit 166 adds "1" to the vertical variable j, and initializes (substitutes "0" to) the horizontal variable i (S454). Then, the grouping unit 166 adds "1" to the horizontal variable i (S456).

The grouping unit 166 obtains a pixel (i, j, p, dp, x, y, z) as the target portion from the luminance image 124 (S458). Then, a determination is made as to whether an identification number p of the specific object is assigned to the pixel (i, j, p, dp, x, y, z) (S460). When the identification number p is assigned (YES in S460), the grouping unit 166 determines whether or not there is another pixel (i, j, p, dp, x, y, z) assigned the same identification number p within a predetermined range from the coordinate (x, y, z) in the real world of the pixel (i, j, p, dp, x, y, z) (S462).

When there is another pixel (i, j, p, dp, x, y, z) assigned the same identification number (YES in S462), the grouping unit 166 determines whether the group number g is given to any of all the pixels within the predetermined range including the pixel under determination (S464). When the group number g is given to any of them (YES in S464), the grouping unit 166 assigns a value to all of the pixels included within the predetermined range and all of the pixels to which the same group number g is given, the value being a smaller one of the smallest group number g among the group numbers g given thereto or the smallest value of numbers that have not yet used as the group numbers g, so as to expressed as a pixel (i, j, p, dp, x, y, z, g) (S466). When the group number g is given to none of them (NO in S464), the smallest value of numbers g that have not yet used as the group numbers g is newly assigned to all the pixels within the predetermined range including the pixel under determination (S468).

In this manner, when there are multiple target portions that have a same identification number p within the predetermined range, grouping process is performed by assigning one group number g. If a group number g is given to none of the multiple target portions, a new group number g is assigned, and if a group number g is already given to any one of them, the same group number g is assigned to the other target portions. However, when there are multiple group numbers g in multiple target portions, the group numbers g of all the target portions are replaced with one group number g so as to treat the target portions as one group.

In the above description, the group numbers g of not only all the pixels included within the predetermined range but also all the pixels to which the same group number g is given are changed at a time. The primary reason for this is to avoid dividing the group already unified by changing the group numbers g. In addition, a smaller one of the smallest group number g or the smallest value of numbers that have not yet used as the group numbers g is employed in order to avoid making a skipped number as much as possible upon group numbering. In so doing, the maximum value of the group number g does not become unnecessarily large, and the processing load can be reduced.

When the identification number p is not assigned (NO in S460), or when there is no other pixel that has the same identification number p (NO in S462), the processing in step S470 subsequent thereto is performed.

Subsequently, the grouping unit 166 determines whether or not the horizontal variable i is equal to or more than 600, which is the maximum value of pixel number in the horizontal direction (S470). When the horizontal variable i is less than the maximum value (NO in S470), the processing is repeated from the increment processing of the horizontal variable i in step S456. When the horizontal variable i is equal to or more than the maximum value (YES in S470), the grouping unit 166 determines whether or not the vertical variable j is equal to or more than 180, which is the maximum value of pixel number in the vertical direction (S472). When the vertical variable j is less than the maximum value (NO in S472), the processing is repeated from the increment processing of the vertical variable j in step S454. When the vertical variable j is equal to or more than the maximum value (YES in S472), the grouping processing S302 is terminated.

(Specific Object Determining Processing S304)

Figure 14:
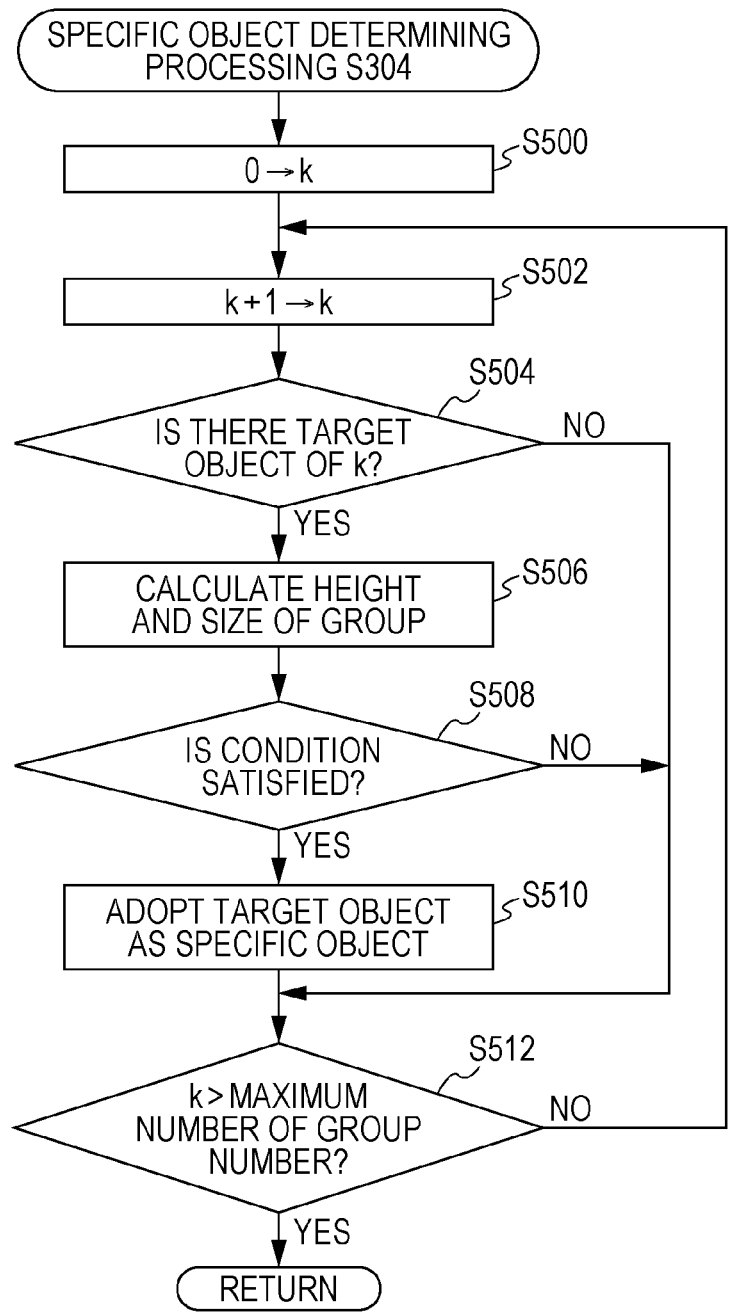
FIG. 14 is a flowchart illustrating a flow of specific object determining processing.

As illustrated in FIG. 14, the specific object determining unit 168 initializes (substitutes "0" to) a group variable k for specifying a group (S500). Subsequently, the specific object determining unit 168 adds "1" to the group variable k (S502).

The specific object determining unit 168 determines whether or not there is a target object of which group number g is the group variable k from the luminance image 124 (S504). When there is such target object (YES in S504), the specific object determining unit 168 calculates the height and the size of the target object to which the group number g is given (S506). Then, a determination is made as to whether or not the calculated height and the calculated size are included within the height range 208 and the width range 210 of a specific object represented by the identification number p assigned to the target object of which group number g is the group variable k, and whether or not the condition unique to the specific object is satisfied (S508).

When the height and the size are included within the height range 208 and the width range 210 of the specific object represented by the identification number p, and the condition unique to the specific object is satisfied (YES in S508), the specific object determining unit 168 determines that the target object is the specific object (S510). When the height and the size are not included within the width range 208 and the width range 210 of the specific object represented by the identification number p, or the condition unique to the specific object is not satisfied (NO in S508), or, when there is no target object of which group number g is the group variable k (NO in S504), the processing in step S512 subsequent thereto is performed.

Subsequently, the specific object determining unit 168 determines whether or not the group variable k is equal to or more than the maximum value of group number set in the grouping processing S302 (S512). Then, when the group variable k is less than the maximum value (NO in S512), the processing is repeated from the increment processing of the group variable k in step S502. When the group variable k is equal to or more than the maximum value (YES in S512), the specific object determining processing S304 is terminated. As a result, the grouped target objects are determined to be the specific object.

(Transparency Reduction Determination Processing S308)

Figure 15:
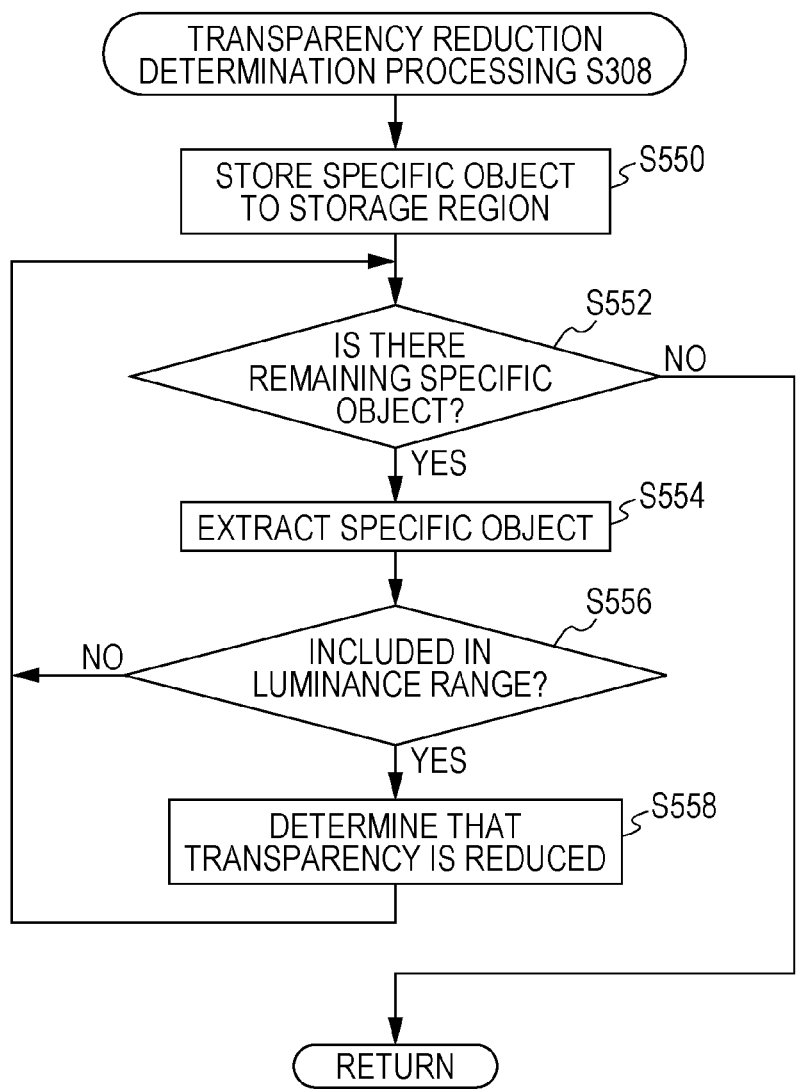
FIG. 15 is a flowchart illustrating a flow of transparency reduction determination processing.

As illustrated in FIG. 15, the transparency reduction determination unit 172 stores the target object determined to be the specific object in the specific object determining processing S304 (hereinafter referred to as specific object) to a predetermined storage region (S550). Then, the transparency reduction determination unit 172 determines whether the specific object remains in the storage region (S552). As a result, when the specific object remains (YES in S552), one specific object is extracted, and the specific object is deleted from the storage region (S554). When the specific object does not remain (NO in S552), the transparency reduction determination processing S308 is terminated.

Subsequently, the transparency reduction determination unit 172 determines whether the luminances of the target portion corresponding to the extracted specific object are included in the luminance range 206 associated with the specific object in the dirt determination table 202 (S556). As a result, if the luminances are included in the luminance range 206 (YES in S556), the transparency of the transparent body 2 is determined to have been reduced with regard to the divided region 230 including the specific object (S558), the processing in step S552 and subsequent steps are repeated. When the luminances are not included in the range of the luminance (NO in S556), no processing is performed, and the processing in step S552 and subsequent steps are repeated. In this manner, the reduction in the transparency of the transparent body 2 with regard to the specific object is determined.

(Correction Amount Deriving Processing S310)

Figure 16:
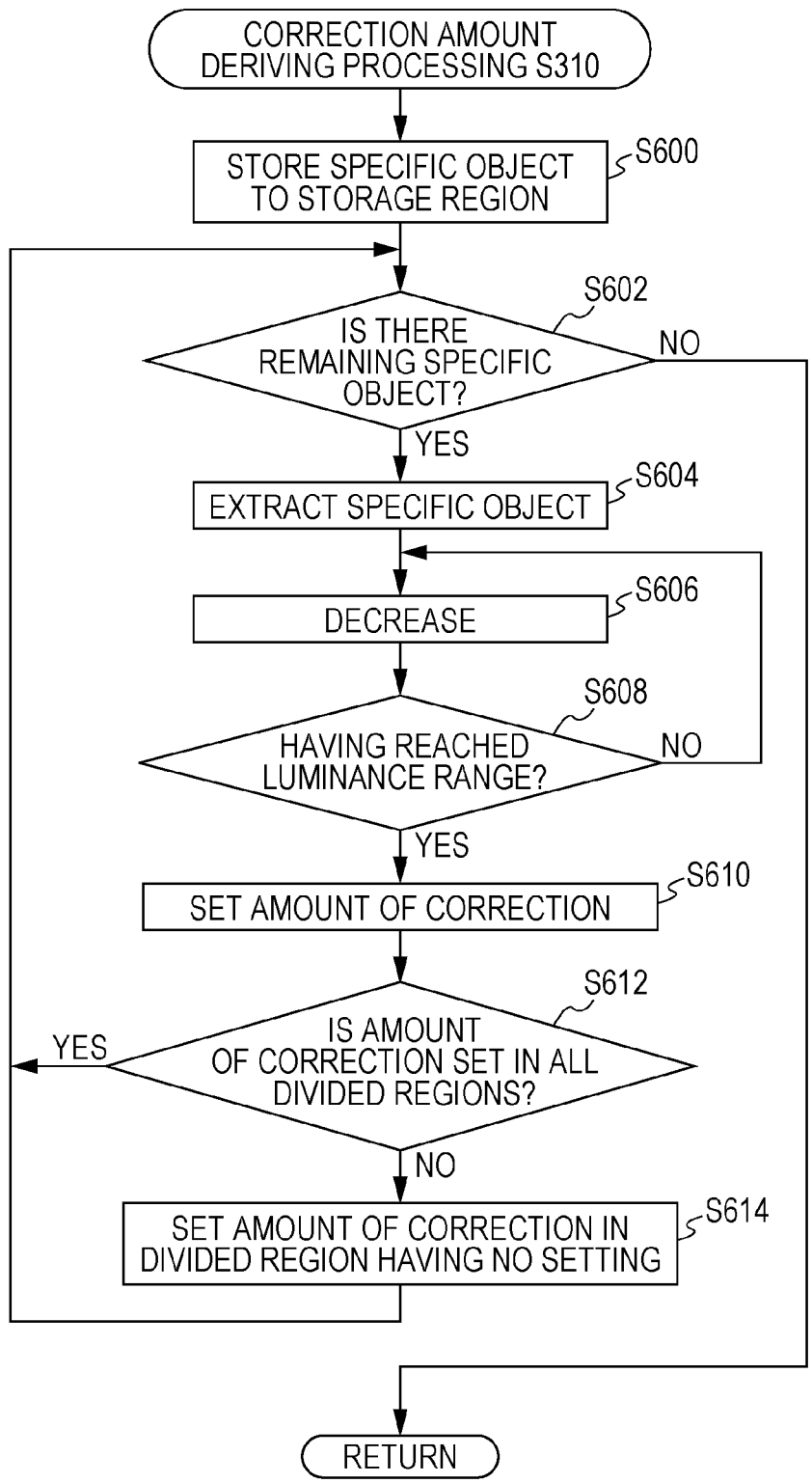
FIG. 16 is a flowchart illustrating a flow of correction amount deriving processing.

As illustrated in FIG. 16, the correction amount deriving unit 174 stores the specific object of which transparency is determined to have been reduced in the transparency reduction determination processing S308 to a predetermined storage region (S600). Then, the correction amount deriving unit 174 determines whether the specific object remains in the storage region (S602). As a result, when the specific object remains (YES in S602), one specific object is extracted, and the specific object is deleted from the storage region (S604). When the specific object does not remain (NO in S602), the correction amount deriving processing S310 is terminated.

Subsequently, the correction amount deriving unit 174 reduces the luminances of the target portion corresponding to the extracted specific object (S606), and a determination is made as to whether the resultant luminances have reached the luminance range 206 of the specific object in the correction reference table 204 (S608). If the resultant luminances are determined to have reached the luminance range 206 (YES in S608), the processing in step S610 subsequent thereto is performed. If the resultant luminances are determined not to have reached the luminance range 206, the processing in step S606 and subsequent steps are repeated.

Then, the correction amount deriving unit 174 defines, as the amount of correction for the divided region 230 including the specific object, a difference from the value before the decrement when the luminance range 206 has been reached (S610). The correction amount deriving unit 174 may derive the time average value of the amount of correction derived this time and the amount of correction previously derived in the same detection region 122 or the same divided region 230, and adopt the time average value as the amount of correction again. When the correction amount deriving unit 174 derives the amount of correction, the exposure time when the amount of correction is derived is obtained, and also derives the basic amount of correction obtained by dividing the amount of correction by the exposure time.

Subsequently, the correction amount deriving unit 174 determines whether or not the amount of correction has been set in all the divided regions 230 (S612). If there is a divided region 230 for which the amount of correction is not set (NO in S612), the correction amount deriving unit 174 averages the amounts of corrections of one or more divided regions 230 for which the amount of correction is derived, and adopts the average value as the amount of correction of the divided region 230 for which the amount of correction is not derived (S614), and the processing in step S602 and subsequent steps are repeated. If the amount of correction has been set in all the divided regions 230 (YES in S612), no processing is performed, and the processing in step S602 and subsequent steps are repeated. In this manner, the amount of correction is set for each divided region 230.

As described hereinabove, according to the exterior environment recognition device 130, existence of dirt or fog on the windshield and the optical component of the onboard camera can be detected, and the image can be appropriately recognized using the color information even under such environment.

In addition, a program for allowing a computer to function as the exterior environment recognition device 130 is also provided as well as a storage medium such as a computer-readable flexible disk, a magneto-optical disk, a ROM, a CD, a DVD, and a BD storing the program. Here, the program means a data processing function described in any language or description method.

The present invention is not limited to the above-described example. It will be apparent to those skilled in the art that various changes may be made without departing from the scope of the invention.

In the above example, the luminance obtaining unit 160, the position information obtaining unit 162, the specific object provisional determining unit 164, the grouping unit 166, the specific object determining unit 168, the transparency reduction determination unit 172, the correction amount deriving unit 174, and the luminance correction unit 176 are configured to be operated by the central control unit 154 with software. However, the functional units may be configured with hardware.

In the above example, the transparency reduction determination unit 172 detects a reduction in the transparency of the transparent body 2, and thereafter the luminance correction unit 176 corrects the luminance of the target portion on the bass of the amount of correction by the determination result. However, the present invention is not limited thereto. Only the transparency reduction determination unit 172 may determine a reduction in the transparency of the transparent body 2. For example, when the transparency reduction determination unit 172 detects a reduction in the transparency of the transparent body 2, this may be informed to a driver and a passenger of the vehicle 1. In addition, without making a determination, the luminance correction unit 176 may correct the luminance. For instance, the specific object correspondence table 200 may be used to identify a specific object, and thereafter only the correction reference table 204 may be used to make correction without causing the dirt determination table 202 to determine a reduction in the transparency of the transparent body 2.

In the above example, for the sake of convenience, the specific object correspondence table 200 is described with the traffic light (red), the traffic light (blue), the road sign (blue), and the road sign (green) are used for the description, but the present invention is not limited thereto. Any specific object which exists on the road and of which RGB values are substantially constant may be adopted as the target. For instance, the RGB values of a turn signal can be roughly identified, and although there is some variation, the RGB values of a tail lamp can be roughly identified. Thus, they can be used as specific objects.

The steps of the environment recognition method in the above example do not necessarily need to be processed chronologically according to the order described in the flowchart. The steps may be processed in parallel, or may include processing using subroutines.

The present invention can be used for an exterior environment recognition device and an environment recognizing method for recognizing a target object based on the luminances of the target object in a detection region.

The invention claimed is:

1. An exterior environment recognition device for recognizing the environment outside of a subject vehicle, on the basis of a color image captured by an onboard camera, the exterior environment recognition device comprising:
   a specific object detection unit to detect a specific object on the basis of the color image;
   a data retaining unit to associate and retain the specific object and a luminance range indicating the color of the specific object, and to associate and retain the specific object and the original luminance of the specific object;
   a transparency reduction determination unit to compare a luminance of the color image of the specific object and a luminance range associated with the specific object, and to determine a reduction in transparency of a transparent body located in an image-capturing direction of the onboard camera;
   a correction amount deriving unit to derive the amount of correction on the basis of a difference between luminance in the color image of the specific object and the original luminance associated with the specific object; and
   a luminance correction unit to correct the luminance of the target portion of the color image on the basis of the amount of correction thus derived,
   wherein the specific object detection unit detects the specific object on the basis of the corrected color image.

2. The exterior environment recognition device according to claim 1, wherein
   the correction amount deriving unit derives a basic amount of correction obtained by dividing the derived amount of correction by an exposure time of the color image; and
   the luminance correction unit corrects the luminance of the target portion of the color image on the basis of the amount of correction obtained by multiplying the basic amount of correction by the exposure time of the color image of correction target.

3. The exterior environment recognition device according to claim 1, wherein the correction amount deriving unit derives the amount of correction per divided region obtained by dividing the color image into multiple regions.

4. The exterior environment recognition device according to claim 2, wherein the correction amount deriving unit derives the amount of correction per divided region obtained by dividing the color image into multiple regions.

5. The exterior environment recognition device according to claim 3, wherein the correction amount deriving unit derives an amount of correction of a divided region for which the amount of correction is not derived, on the basis of an amount of correction of a divided region for which an amount of correction is derived.

6. The exterior environment recognition device according to claim 4, wherein the correction amount deriving unit derives an amount of correction of a divided region for which the amount of correction is not derived, on the basis of an amount of correction of a divided region for which an amount of correction is derived.

7. The exterior environment recognition device according to claim 1, wherein the correction amount deriving unit adopts again, as the amount of correction, a time average value of the amount of correction derived on the basis of a difference between luminance of the color image of the specific object and the original luminance associated with the specific object and the amount of correction previously derived in the same detection region or the same divided region.

8. The exterior environment recognition device according to claim 2, wherein the correction amount deriving unit adopts again, as the amount of correction, a time average value of the amount of correction derived on the basis of a difference between luminance of the color image of the specific object and the original luminance associated with the specific object and the amount of correction previously derived in the same detection region or the same divided region.

9. The exterior environment recognition device according to claim 1, wherein the specific object detection unit detects the specific object on the basis of temporal change of the luminance of the color image over time.

10. The exterior environment recognition device according to claim 2, wherein the specific object detection unit detects the specific object on the basis of temporal change of the luminance of the color image over time.

11. The exterior environment recognition device according to claim 3, wherein the specific object detection unit detects the specific object on the basis of temporal change of the luminance of the color image over time.

12. The exterior environment recognition device according to claim 3, wherein the correction amount deriving unit adopts again, as the amount of correction, a time average value of the amount of correction derived on the basis of a difference between luminance of the color image of the specific object and the original luminance associated with the specific object and the amount of correction previously derived in the same detection region or the same divided region.

13. The exterior environment recognition device according to claim 4, wherein the correction amount deriving unit adopts again, as the amount of correction, a time average value of the amount of correction derived on the basis of a difference between luminance of the color image of the specific object and the original luminance associated with the specific object and the amount of correction previously derived in the same detection region or the same divided region.

14. The exterior environment recognition device according to claim 4, wherein the specific object detection unit detects the specific object on the basis of temporal change of the luminance of the color image over time.

\* \* \* \* \*